United States Patent
Zhu et al.

(10) Patent No.: US 9,609,063 B2
(45) Date of Patent: Mar. 28, 2017

(54) METHOD, DEVICE AND SYSTEM FOR LOGGING IN UNIX-LIKE VIRTUAL CONTAINER

(71) Applicant: TENCENT TECHNOLOGY (SHENZHEN) COMPANY LIMITED, Shenzhen (CN)

(72) Inventors: Baiwan Zhu, Shenzhen (CN); Jie Huang, Shenzhen (CN); Ke Lu, Shenzhen (CN); Lifeng Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 108 days.

(21) Appl. No.: 14/428,755

(22) PCT Filed: Sep. 16, 2013

(86) PCT No.: PCT/CN2013/083546
§ 371 (c)(1),
(2) Date: Mar. 17, 2015

(87) PCT Pub. No.: WO2014/040562
PCT Pub. Date: Mar. 20, 2014

(65) Prior Publication Data
US 2015/0244811 A1    Aug. 27, 2015

(30) Foreign Application Priority Data
Sep. 17, 2012  (CN) .......................... 2012 1 0345405

(51) Int. Cl.
G06F 15/16   (2006.01)
H04L 29/08   (2006.01)
(Continued)

(52) U.S. Cl.
CPC .............. H04L 67/141 (2013.01); G06F 9/00 (2013.01); G06F 9/544 (2013.01); G06F 21/00 (2013.01);
(Continued)

(58) Field of Classification Search
CPC ......... H04L 67/141; H04L 67/02; G06F 9/00; G06F 9/544; G06F 21/00; G06F 21/54;
(Continued)

(56) References Cited

U.S. PATENT DOCUMENTS 4,945,468 A * 7/1990 Carson .................. G06F 9/468
726/15
5,884,309 A * 3/1999 Vanechanos, Jr. ..... G06Q 10/10
(Continued)

FOREIGN PATENT DOCUMENTS

| CN | 101605084 A | 12/2009 |
|---|---|---|
| CN | 102333098 A | 1/2012 |
| RU | 2458394 C2 | 10/2010 |

OTHER PUBLICATIONS

European Search Report issed Oct. 9, 2015 re: Application No. PCT/CN2013/083546.
(Continued)

*Primary Examiner* — Melvin H Pollack
(74) *Attorney, Agent, or Firm* — Cantor Colburn LLP

(57) ABSTRACT

Various embodiments of the present disclosure describe a method, apparatus and system for logging in a Unix-like virtual container. The method include establishing a corresponding relationship between a Unix-like virtual container and a port on a host running the Unix-like virtual container; establishing a transparent pipe between the Unix-like virtual container and the host port based on the corresponding relationship, establishing a first connection between the Unix-like virtual container and the host port based on the
(Continued)

transparent pipe; receiving a script command through the host port, and sending the script command to the Unix-like virtual container according to the first connection. Employing embodiments of the present disclosure, the Unix-like virtual container can be logged in through the connection between the host port and the Unix-like virtual container, the information security of the Unix-like virtual container can be ensured, and the access efficiency can be improved through asynchronous access.

13 Claims, 8 Drawing Sheets

(51) Int. Cl.
  *G06F 9/00* (2006.01)
  *G06F 21/00* (2013.01)
  *G06F 21/54* (2013.01)
  *G06F 9/54* (2006.01)
(52) U.S. Cl.
  CPC .............. *G06F 21/54* (2013.01); *H04L 67/02* (2013.01); *G06F 9/547* (2013.01); *G06F 2209/549* (2013.01); *G06F 2221/2101* (2013.01)
(58) Field of Classification Search
  CPC .............. G06F 9/547; G06F 2209/549; G06F 2221/2101
  USPC ........................................................ 709/228
  See application file for complete search history.

(56) References Cited

U.S. PATENT DOCUMENTS

| | | | |
|---|---|---|---|
| 5,930,341 A | 7/1999 | Cardillo, IV et al. | |
| 5,968,134 A * | 10/1999 | Putzolu | G06F 17/30067 707/E17.01 |
| 7,685,083 B2 * | 3/2010 | Fairweather | G06F 8/427 706/45 |
| 8,060,604 B1 * | 11/2011 | Breau | G06F 9/541 709/224 |
| 8,380,880 B2 * | 2/2013 | Gulley | G06F 9/5027 709/217 |
| 8,422,397 B2 * | 4/2013 | Ansari | H04L 12/66 370/254 |
| 8,438,654 B1 * | 5/2013 | von Eicken | G06F 21/53 709/217 |
| 8,457,781 B2 * | 6/2013 | Bailey | B07C 3/00 700/224 |
| 8,463,909 B1 * | 6/2013 | Szabo | H04L 67/2819 370/412 |
| 8,555,366 B2 * | 10/2013 | Joffray | H04L 67/34 709/225 |
| 8,601,556 B2 * | 12/2013 | Kanekar | H04L 63/0823 709/228 |
| 8,639,116 B2 * | 1/2014 | Hui | H04Q 11/0005 398/50 |
| 8,689,181 B2 * | 4/2014 | Biron, III | H04L 67/10 717/115 |
| 8,705,954 B2 * | 4/2014 | Singla | H04J 14/0204 398/14 |
| 8,726,014 B2 * | 5/2014 | Scovetta | H04N 7/162 380/201 |
| 8,897,253 B2 * | 11/2014 | Shin | H04L 5/001 370/329 |
| 8,924,505 B2 * | 12/2014 | Molland | H04L 29/08846 709/217 |
| 8,949,463 B2 * | 2/2015 | Kominac | G06F 17/30905 709/203 |
| 9,201,671 B2 * | 12/2015 | Vincent | G06F 9/45558 |
| 9,253,159 B2 * | 2/2016 | Chauhan | H04L 63/0272 |
| 9,262,238 B2 * | 2/2016 | Kunze | G06F 9/542 |
| 9,311,158 B2 * | 4/2016 | Tompkins | G06F 9/5072 |
| 9,395,885 B1 * | 7/2016 | Kominac | G06F 3/0484 |
| 2003/0158925 A1 | 8/2003 | Uniacke | |
| 2003/0187995 A1 | 10/2003 | Fok et al. | |
| 2006/0123010 A1 * | 6/2006 | Landry | G06F 17/30557 |
| 2007/0180493 A1 * | 8/2007 | Croft | G06F 3/1415 726/2 |
| 2007/0192502 A1 | 8/2007 | McCollum et al. | |
| 2007/0234228 A1 | 10/2007 | Rao et al. | |
| 2007/0282964 A1 | 12/2007 | Behrend et al. | |
| 2008/0127125 A1 | 5/2008 | Anckaert et al. | |
| 2009/0228821 A1 | 9/2009 | Tapper | |
| 2009/0327471 A1 | 12/2009 | Astete et al. | |
| 2010/0057918 A1 | 3/2010 | Riemers | |
| 2011/0265164 A1 * | 10/2011 | Lucovsky | G06F 9/45533 726/7 |
| 2012/0054861 A1 | 3/2012 | Pawlowsky | |
| 2013/0198718 A1 * | 8/2013 | Kunze | G06F 8/61 717/121 |
| 2013/0305045 A1 * | 11/2013 | Potekhin | H04L 67/2847 713/165 |
| 2014/0059226 A1 * | 2/2014 | Messerli | G06F 9/5072 709/226 |
| 2015/0237008 A1 * | 8/2015 | Ansari | H04L 63/02 726/1 |
| 2016/0072727 A1 * | 3/2016 | Leafe | H04L 47/781 709/226 |

OTHER PUBLICATIONS

Dani Coulson et al. "Libvirt 0.7.5 Application Development Guide, a guide to application development with libvirt", Aug. 23, 2010, Draft Edition 1, Revision 4, pp. 1-96; XP055217354.

Matt Helsley, "LXC: Linux container tools, Tour and set up the new container tools called Linux Container", IBM developerWorks, Feb. 3, 2009; pp. 1-10; ibm.com/developerWorks; XP055217383.

International Preliminary Report on Patentability and Written Opinion issued Mar. 26, 2015 re: Application No. PCT/CN2013/083546; pp. 1-15.

libssh2 docs, http://libssh2.org/docs.html, pp. 1-4.

T. Ylonen "The Secure Shell (SSH) Authentication Protocol", The Internet Society, Standards Track, Network Working Group, Jan. 2006, pp. 1-17.

International Search Report issued Dec. 19, 2013 re: PCT/CN2013/083546.

RU Office Action issued Jul. 6, 2016 re: Application No. 2015113503; pp. 1-12.

* cited by examiner

METHOD, DEVICE AND SYSTEM FOR LOGGING IN UNIX-LIKE VIRTUAL CONTAINER

CROSS-REFERENCE TO RELATED APPLICATIONS

This application is a U.S. National Phase application under 35 U.S.C. §371 of International Application No. PCT/CN2013/083546, filed Sep. 16, 2013, entitled "METHOD, DEVICE AND SYSTEM FOR LOGGING IN UNIX-LIKE VIRTUAL CONTAINER", the entire disclosures of which are incorporated herein by reference.

FIELD OF THE INVENTION

Embodiments of the present disclosure relate to cloud computing technology, and more particularly, to a method, apparatus, and system for logging in a Unix-like virtual container.

BACKGROUND OF THE INVENTION

The cloud computing mainly includes increase, usage and delivery modes based on Internet-related services. Usually, the cloud computing involves providing dynamic and extensible virtualized resources via the Internet. The naissance of the cloud computing means that a computing capability can be regarded as a commodity for circulation through the Internet. The narrowly-defined cloud computing involves delivery and usage modes of IT infrastructures, which means to obtain desired resources on-demand and in an easily extensible way through the network. The generalized cloud computing involves delivery and usage modes of services, which means to obtain a desired service on-demand and in the easily extensible way through the network. The desired service may be associated with the IT, software and the Internet, or may be other services.

Usually, a cloud computing platform may be divided into three categories, i.e., a cloud platform of a storage type mainly used for data storage, a cloud platform of a computing type mainly used for data processing, and a comprehensive cloud computing platform used for data storage and data processing such as computing.

SUMMARY OF THE INVENTION

Embodiments of the present disclosure describe a method, apparatus and system for logging in a Unix-like virtual container, so that a Unix-like virtual container can be logged in and a script command can be sent to the Unix-like virtual container.

Various embodiments of the present disclosure describe a method for logging in a Unix-like virtual container, including:
establishing a corresponding relationship between a Unix-like virtual container and a port on a host running the Unix-like virtual container;
establishing a transparent pipe between the Unix-like virtual container and the host port based on the corresponding relationship, and establishing a first connection between the Unix-like virtual container and the host port based on the transparent pipe; and
receiving a script command through the host port, and sending the script command to the Unix-like virtual container according to the first connection;
wherein after receiving the script command through the host port and before sending the script command to the Unix-like virtual container, the method further comprises:
partitioning the script command according to a preset marker and performing symbol extension to the partitioned script command to obtain a symbol-extended script command;
determining whether the symbol-extended script command is included in a preset script command whitelist; and
in response to determining that the symbol-extended script command is included in the preset script command whitelist, sending the symbol-extended script command to the Unix-like virtual container according to the first connection.

Various embodiments of the present disclosure describe an apparatus for logging in a Unix-like virtual container, including:
a transparent pipe establishing module, configured to
establish a corresponding relationship between a Unix-like virtual container and a port on a host running the Unix-like virtual container, and establish a transparent pipe between the Unix-like virtual container and the host port based on the corresponding relationship;
a connection establishing module, configured to
establish a first connection between the Unix-like virtual container and the host port based on the transparent pipe; and
a script command sending module, configured to
receive a script command through the host port and send the script command to the Unix-like virtual container according to the first connection;
a script command preprocessing module, configured to
partition the script command according to a preset marker,
perform symbol extension to the partitioned script command to obtain a symbol-extended script command,
determine whether the symbol-extended script command is included in a preset script command whitelist, and
in response to determining that the symbol-extended script command is included in the preset script command whitelist, enable the script command sending module to send the symbol-extended script command to the Unix-like virtual container according to the first connection.

Various embodiments of the present disclosure describe a system for logging in a Unix-like virtual container, including a Web browser, a Unix-like virtual container login apparatus, and a host; wherein the host runs a Unix-like virtual container and there is a hypertext transfer protocol (HTTP) connection between the Web browser and the Unix-like virtual container login apparatus;
wherein
the Web browser is configured to
receive a script command and send the script command to the Unix-like virtual container login apparatus through the HTTP connection; and
the Unix-like virtual container login apparatus is configured to
establish a corresponding relationship between the Unix-like virtual container and a port on the host, and establish a transparent pipe between the Unix-like virtual container and the host port based on the corresponding relationship,
establish a first connection between the Unix-like virtual container and the host port based on the transparent pipe,
receive the script command sent from the Web browser through the host port, and
send the script command to the Unix-like virtual container according to the first connection;
wherein the Unix-like virtual container login apparatus is further configured to
partition the script command according to a preset marker,
perform symbol extension to the partitioned script command to obtain a symbol-extended script command,
determine whether the symbol-extended script command is included in a preset script command whitelist, and
in response to determining that the symbol-extended script command is included in the preset script command whitelist, send the symbol-extended script command to the Unix-like virtual container according to the first connection.

As can be seen from the above technical scheme, according to various embodiments of the present disclosure, a corresponding relationship between a Unix-like virtual container and a port on a host running the Unix-like virtual container is established. A transparent pipe between the Unix-like virtual container and the host port is established based on the corresponding relationship between the Unix-like virtual container and the host port. A first connection between the Unix-like virtual container and the host port is established based on the transparent pipe. A script command is received through the host port and the script command is sent to the Unix-like virtual container according to the first connection. When various embodiments of the present disclosure are employed, the Unix-like virtual container can be logged in through the connection between the host port and the Unix-like virtual container and the script command can be sent to the Unix-like virtual container from the outside of the host. Therefore, information within the Unix-like virtual container such as files, CPU information, disk I/O, network I/O, and so forth, can be easily viewed according to the script command, which is important for various operations like online debugging, log viewing, real-time control of device resources, and so on. Moreover, the login of the Unix-like virtual container through the host port can ensure the information security of the Unix-like virtual container. Further, the access efficiency can be improved through asynchronous access.

DETAILED DESCRIPTION OF THE INVENTION

Figure 1:
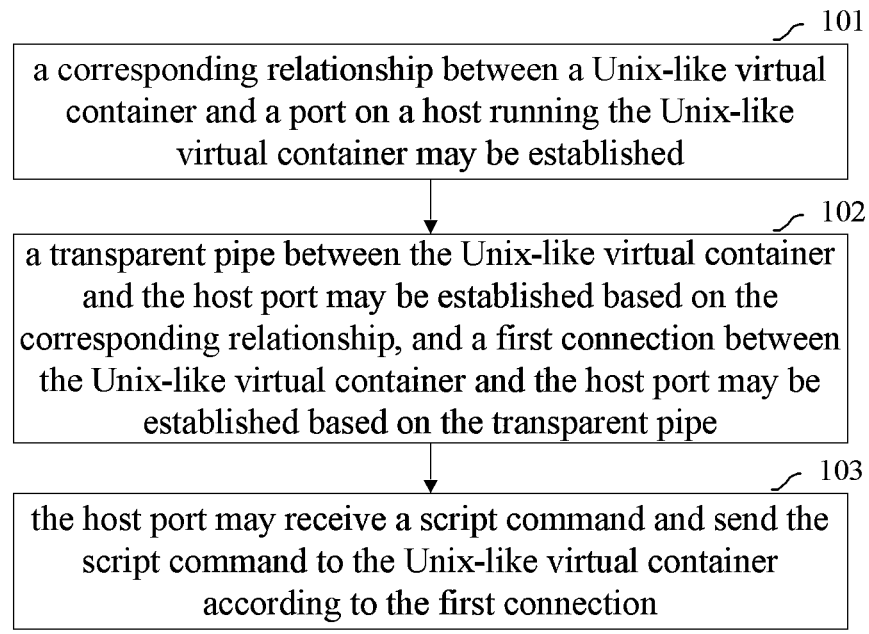
FIG. 1 is a flowchart illustrating a method for logging in a Unix-like virtual container, according to various embodiments of the present disclosure.

Hereinafter, the present disclosure will be described in further detail with reference to the accompanying drawings and exemplary embodiments.

Currently, there is a technical scheme in which the cloud computing platform is implemented by use of virtual machines. This scheme has advantages like strong customization characteristics and comprehensive cloud services, but the price is expensive and therefore it is difficult to promote this scheme.

In addition to implementing the cloud computing platform using the virtual machines, there is still another technical scheme in which a cloud computing system is implemented by use of Cloud Elastic Engine (CEE). According to the CEE technology, a Linux resource group controller (may be referred to as cgroup) is used as a resource division manner and a Linux Virtual Container (may be referred to as LXC) is used as a virtualization manner. In this case, the cgroup is supported by the Linux kernel and provides a performance control mechanism and a resource division and limitation manner for a process and a subsequent subprocess of the process. The Linux virtual container is a virtualization scheme which is supported by the Linux kernel and at an operating system level. According to the CEE technology, in addition to Linux, various types of a Unix-like virtual container like FreeBSD, OpenBSD, Solaris, Minix, Linux, QNX may be used.

Unlike the cloud computing platform implemented by the virtual machines, the cloud computing system implemented by the CEE does not require booting hardware and costs relatively small overhead. Generally, in order to ensure intranet security, a Unix-like virtual container is not independent of a master host and does not expose an IP address of the Unix-like virtual container, and therefore the network of the Unix-like virtual container is isolated from the outside world. As such, the Unix-like virtual container cannot be directly logged in from the outside and a script command cannot be transmitted to the Unix-like virtual container. Therefore, information within the Unix-like virtual container cannot be obtained. For example, the information within the Unix-like virtual container such as files, CPU information, disk I/O, network I/O, and so forth, cannot be viewed. However, such information is important for various operations like online debugging, log viewing, real-time control of device resources, and etc.

As the network of the Unix-like virtual container is isolated from the outside, according to various embodiments of the present disclosure, a host running the Unix-like virtual container may be logged in and a corresponding relationship between the Unix-like virtual container and a port on the host may be established to establish a connection between the Unix-like virtual container and the host port. As such, a script command received by the host port from the outside of the host may be sent to the Unix-like virtual container that is running on the host to log in the Unix-like virtual container.

FIG. 1 is a flowchart illustrating a method for logging in a Unix-like virtual container, according to various embodiments of the present disclosure.

As shown in FIG. 1, the method may include following operations.

At block 101, a corresponding relationship between a Unix-like virtual container and a port on a host running the Unix-like virtual container may be established.

In this case, the Unix-like virtual container is running on the host. The Unix-like virtual container may be supported by the Linux kernel. According to various embodiments of the present disclosure, the Unix-like virtual container is a set of virtualized machine-readable instructions which is for a cloud computing platform and at an operating system level. Compared with other virtualization technologies at the operating system level, the Unix-like virtual container is integrated into the Linux kernel without separately patching the kernel. Moreover, the Unix-like virtual container is the virtualization technology at the operating system level, which costs smaller virtualization overhead and can be quickly deployed compared with conventional virtualization technologies at a Hardware Abstraction Layer (HAL) level.

The Unix-like virtual container may be used to isolate a particular application on the host. As long as the Unix-like virtual container is installed on the host, a Unix-like virtual container related command may be used to create and start the container to provide a virtual execution environment for the application. While according to the conventional virtualization technology, a virtual machine is created first, a system is installed and then applications are deployed.

Through establishing the corresponding relationship between the Unix-like virtual container and the port on the host, the host port may be designated for the Unix-like virtual container, so as to provide a basis for establishing a connection with the Unix-like virtual container subsequently. In this case, a plurality of Unix-like virtual containers may be run on the host and an appropriate host port may be designated for each Unix-like virtual container.

According to various embodiments of the present disclosure, the Unix-like virtual container may be various types of the Unix-like virtual container such as a Linux Virtual Container (LXC), FreeBSD, OpenBSD, Solaris, Minix, Linux, QNX, and so on, which is not limited herein.

At block 102, a transparent pipe between the Unix-like virtual container and the host port may be established based on the corresponding relationship between the Unix-like virtual container and the host port, and a first connection between the Unix-like virtual container and the host port may be established based on the transparent pipe.

After the corresponding relationship between the Unix-like virtual container and the host port is established, the transparent pipe between the Unix-like virtual container and the host port may be established. The first connection between the Unix-like virtual container and the host port may be established based on the transparent pipe.

In this case, the transparent pipe is mainly used for large amount of information transmission. The transparent pipe may be used for communication between processes that are between the Unix-like virtual container and the host port and belong to a same user and have a same ancestor. The transparent pipe may be taken as a communication medium to construct a pipelining of information transmission between the processes at the two ends. Usually, a process may be configured to write information to the transparent pipe and another process may be configured to read the information from the transparent pipe. That is, the transparent pipe is a byte stream accessed through general I/O interfaces. After the transparent pipe is created, the transparent pipe may be written or read through calling any read or write I/O system of the operating system. In various types of the UNIX-like environment (such as in an Linux environment), the I/O calling usually uses commands like read( ) and write( ).

In various embodiments of the present disclosure, the first connection between the host port and the Unix-like virtual container may be established through the transparent pipe and based on a Secure Shell protocol (SSH) or a Secure Shell protocol 2 (SSH2). When the SSH protocol is used, the first connection established is an SSH connection. When the SSH2 protocol is used, the first connection established is an SSH2 connection.

By establishing the first connection between the host port and the Unix-like virtual container, the Unix-like virtual container can be logged in and can receive a script command from the outside of the host through the host port corresponding to the Unix-like virtual container.

At block 103, the host port may receive a script command and send the script command to the Unix-like virtual container according to the first connection.

In this case, the host port may receive the script command from the outside of the host and send the script command to the Unix-like virtual container according to the first connection. In this case, the host may obtain the script command from an external browser through a HyperText Transfer Protocol (HTTP) connection with the external browser.

In various embodiments of the present disclosure, in order to ensure the security of the script command, after the host port receives the script command and before the host port sends the script command to the Unix-like virtual container, the method may further include following operations. The script command may be partitioned according to a preset marker. Symbol extension may be performed to the partitioned script command to obtain a symbol-extended script command. It may be determined whether the symbol-extended script command is included in a preset script command whitelist. In response to determining that the symbol-extended script command is included in the preset script command whitelist, the symbol-extended script command may be sent to the Unix-like virtual container according to the first connection. Otherwise, it may be prompted that the command is illegal.

According to various embodiments of the present disclosure, the script command may be partitioned by the marker (for example, the marker may include a semicolon, a pipe symbol, etc.) first. Various types of the symbol extension may be performed to the script command (for example, curly brace extension, etc.) to obtain the symbol-extended script command. Whitelist filtering may be performed to the symbol-extended script command. For example, the command includes a pipe symbol "|", e.g., the command is ls|grep "aa", then commands including is and grep are respectively obtained by identifying the pipe symbol "|". Then, the whitelist filtering is performed. In another example, the command includes parentheses, such as the command is awk '{for(i=0;i<NF;i++) print $i}'/proc/net/tcp. Three groups of character string are partitioned through spaces and quotation marks, in which the first group is awk and the second group is '{for(i=0;i<NF;i++) print $i}'. For the second group, a left curly brace "{" is found and pushed into a stack, and then a right curly brace "}" is searched. During the searching process a left parenthesis "(" is found and pushed into the stack, and then a right parenthesis ")" is searched. After the right parenthesis ")" is found, the command contents between "(" and ")" are obtained and the operation process described in the first example is performed to the command contents.

According to various embodiments of the present disclosure, symbols may be supported in the whitelist may include uppercase and lowercase letters, a space, numbers, "|", "-", "_", "*", "~", ".", ";", "/", ", and so on.

According to various embodiments of the present disclosure, script commands may be supported in the whitelist may include "ls", "tail", "cd", "pwd", "head", "cat", "ps", "free", "vmstat", "iostat", "uptime", "lsof", "ipcs", "mpstat", "grep", "wc", "uniq", "sort", "md5sum", and so on.

Although some symbols and script commands are exemplary enumerated above, one skilled in the art may realize that these symbols and script commands are enumerated for illustrative purposes only and are not intended to limit the protection scope of various embodiments of the present disclosure.

According to various embodiments of the present disclosure, the operation of the host port receiving the script command may be implemented as follows. An HTTP connection between the host port and the browser may be established through the hypertext transfer protocol and the script command may be received through the HTTP connection. In this case, a connection time threshold may be preconfigured and it may be determined whether the HTTP connection between the host port and the browser exceeds the connection time threshold. When the HTTP connection between the host port and the browser exceeds the connection time threshold, the HTTP connection may be disconnected. When the HTTP connection between the host port and the browser does not exceed the connection time threshold, the HTTP connection may be kept. As such, a connection session between the host port and the browser may be kept within a period of time after the browser and the host port are connected through the hypertext transfer protocol. In this case, whether the HTTP connection exceeds the connection time threshold may mean whether the duration of the HTTP connection exceeds the connection time threshold. For example, the connection time threshold may be configured as 60 seconds. If a command associated with a connection is not received within 60 seconds from establishment of the connection, it may be determined that the connection exceeds the configured connection time threshold. In this case, the duration of the connection means a period of time between a time point at which a command associated with the connection is executed last time and a current time point.

According to various embodiments of the present disclosure, when the browser normally exits the host port, the connection session between the browser and the host port may be instantly cleared. When the browser unexpectedly exits the host port, the HTTP connection session between the browser and the host port may be regularly cleared. In this case, clearing the HTTP connection session may mean to disconnect the HTTP connection and clean up resources occupied by the connection in a server. Regularly clearing the HTTP connection session may be defined to mean that the connection is not immediately cleared but is cleared after a predetermined period of time.

According to various embodiments of the present disclosure, a connection time threshold may be configured for the first connection between the host port and the Unix-like virtual container. It may be determined whether the first connection between the host port and the Unix-like virtual container exceeds the connection time threshold. When the first connection exceeds the connection time threshold, the first connection may be disconnected. When the first connection does not exceed the connection time threshold, the first connection may be kept. As such, a session associated with the first connection and between the host port and the Unix-like virtual container may be kept within a period of time after the Unix-like virtual container is logged in. In this case, the way for determining whether the first connection exceeds the connection time threshold may be the same as the way for determining whether the HTTP connection exceeds the connection time threshold, which is not repeated herein.

According to various embodiments of the present disclosure, when the user normally exits the Unix-like virtual container through the host port, the session associated with the first connection may be immediately cleared. When the user unexpectedly exits the Unix-like virtual container, the session associated with the first connection may be regularly cleared. In this case, clearing the session associated with the first connection may mean to disconnect the first connection and clean up resources occupied by the first connection in the server. Regularly clearing the session associated with the first connection may be defined to mean that the connection is not immediately cleared but is cleared after a predetermined period of time.

According to various embodiments of the present disclosure, a plurality of connections may be established through the transparent pipe between the host port and the Unix-like virtual container, and therefore a connection previously established may be closed through a multi-connection nature of the pipe.

For example, the host port may receive an operation terminating script command, in which an identifier (ID) of the first connection is carried in the operation terminating script command. A second connection between the host port and the Unix-like virtual container may be established through the transparent pipe. The operation terminating script command may be sent to the Unix-like virtual container through the second connection. The Unix-like virtual container may extract the ID of the first connection from the operation terminating script command and terminate operations associated with the first connection.

A data transfer operation may be taken as an example. According to various embodiments of the present disclosure, the operation of the host port receiving the script command may include following operations. An HTTP connection between the host port and the browser may be established through the hypertext transfer protocol and the script command may be received through the HTTP connection. To solve an issue that currently the Hypertext Transfer Protocol may only perform one-way communication, i.e., the data stream is only one-way transmitted within the same period of time, the ongoing data transfer operation between the browser and the Unix-like virtual container may be terminated through establishing multiple HTTP connections between the user browser and the host port. For example, the browser of the user is receiving data from the Unix-like virtual container through a first HTTP connection between the browser and the host port and the first connection between the host port and the Unix-like virtual container. At this time, the user wishes to terminate the data transfer operation and does not want to close the first HTTP connection. In this case, the user types an appropriate keyboard command, such as a shortcut key ctrl+c, and a second HTTP connection is established between the browser and the host port. The browser captures the keyboard command typed by the user and sends a request for terminating the data transfer operation through the second HTTP connection, in which an ID of the first HTTP connection is carried in the request. After receiving the request for terminating the data transfer operation sent by the browser, the first HTTP connection is found according to the ID of the first HTTP connection carried in the request and the operation terminating script command is sent to the host port connecting the Unix-like virtual container, so that the host port sends the operation terminating script command to the Unix-like virtual container through the first connection between the Unix-like virtual container and the host port. The Unix-like virtual container executes the operation terminating script command and terminates operations associated with the first HTTP connection, i.e., the data transfer operation is terminated.

According to various embodiments of the present disclosure, the operation of the host port receiving the script command may be implemented as follows. An HTTP connection between the host port and the browser may be established through the hypertext transfer protocol and the script command may be received through the HTTP connection. The method may further include following operations. It may be determined whether the HTTP connection between the host port and the browser is disconnected. In response to determining that the HTTP connection between the host port and the browser is disconnected, the operation terminating script command may be sent to the Unix-like virtual container based on the first connection between the Unix-like virtual container and the host port that is established based on the transparent pipe. The Unix-like virtual container executes the operation terminating script command and the operations associated with the HTTP connection are terminated.

According to various embodiments of the present disclosure, an analog interface used for displaying various script commands and script command responses may be implemented through a variety of open-source libraries (e.g., termlib). According to an embodiment of the present disclosure, a command display interface may be generated through an open-source library. A user keyboard operating character associated with the script command received by the host port may be captured. The user keyboard operating character may be displayed on the command display interface.

For example, a keyboard command of the user may be captured by use of a JavaScript. The keyboard command may be displayed on the command display interface. Alternatively, the keyboard command may be sent to a computer graphics interface (CGI) of the host for processing and a processing result returned from the host may be displayed on the command display interface. In this way, a variety of script commands may be displayed, such as auto-completion, interactive operation, and so on.

According to various embodiments of the present disclosure, the Unix-like virtual container responds to the script command and returns a script command response to the host port in a manner of data chunking. The host port sends the chunked data to an interface of the browser for synchronized displaying.

According to an embodiment of the present disclosure, the host may ensure, through a BigPipe function of QZHTTP, that script commands like "vmstat 1" and "tail-f" may continue to return data. The host may return one data chunk each time and the size of the chunk may be changed each time. According to various embodiments of the present disclosure, each chunk may be compressed and may be immediately executed and available. In this way, the host may output the chunk and the chunk may be simultaneously displayed on a display interface corresponding to the host port.

Moreover, the Unix-like virtual container is logged in through the host port instead of directly operating the Unix-like virtual container, and therefore the information security of the Unix-like virtual container can be ensured. In addition, the host port can improve the access efficiency through asynchronously accessing the Unix-like virtual container.

Based on the above descriptions, various embodiments of the present disclosure describe an apparatus for logging in a Unix-like virtual container.

Figure 2:
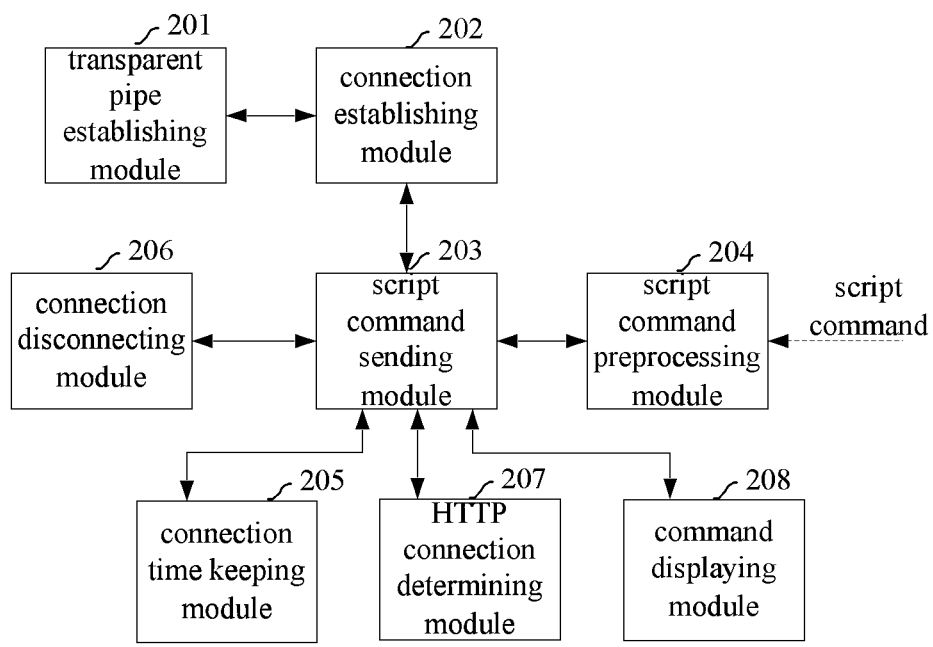
FIG. 2 is a diagram illustrating a structure of an apparatus for logging in a Unix-like virtual container, according to various embodiments of the present disclosure.

FIG. 2 is a diagram illustrating a structure of the apparatus for logging in a Unix-like virtual container, according to various embodiments of the present disclosure.

Figure 2A:
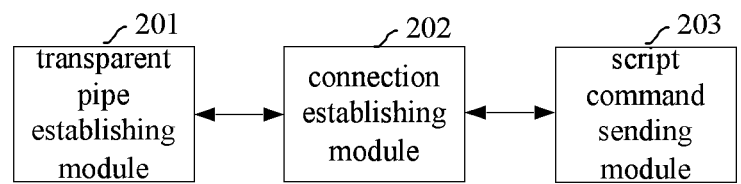
FIG. 2A is a diagram illustrating a structure of an apparatus for logging in a Unix-like virtual container, according to various embodiments of the present disclosure.

According to an embodiment of the present disclosure, the apparatus may include a transparent pipe establishing module 201, a connection establishing module 202, and a script command sending module 203, as shown in FIG. 2A.

The transparent pipe establishing module 201 may establish a corresponding relationship between a Unix-like virtual container and a port on a host running the Unix-like virtual container, and establish a transparent pipe between the Unix-like virtual container and the host port based on the corresponding relationship.

The connection establishing module 202 may establish a first connection between the Unix-like virtual container and the host port based on the transparent pipe.

The script command sending module 203 may receive a script command through the host port and send the script command to the Unix-like virtual container according to the first connection.

Figure 2B:
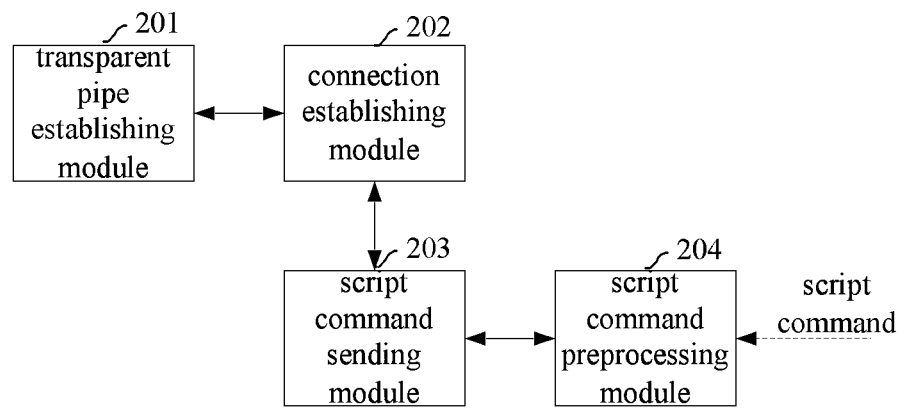
FIG. 2B is a diagram illustrating a structure of an apparatus for logging in a Unix-like virtual container, according to various embodiments of the present disclosure.

In an embodiment, the apparatus may further include a script command preprocessing module 204, as shown in FIG. 2B The script command preprocessing module 204 may partition the script command according to a preset marker and perform symbol extension to the partitioned script command to obtain a symbol-extended script command. The script command preprocessing module 204 may determine whether the symbol-extended script command is included in a preset script command whitelist. In response to determining that the symbol-extended script command is included in the preset script command whitelist, the script command preprocessing module 204 may enable the script command sending module 203 to send the symbol-extended script command to the Unix-like virtual container according to the first connection. Otherwise, the script command preprocessing module 204 may prompt that the command is illegal.

According to various embodiments of the present disclosure, the script command may be partitioned by the marker (for example, the marker may include a semicolon, a pipe symbol, etc.) first. Various types of the symbol extension may be performed to the script command (for example, curly brace extension, etc.) to obtain the symbol-extended script command.

Whitelist filtering may be performed to the symbol-extended script command. The detailed process is the same as that described in the method embodiments, which is not repeated herein.

According to various embodiments of the present disclosure, symbols may be supported in the whitelist may include uppercase and lowercase letters, a space, numbers, "|", "-", "_", "*", "~", ".", ";", "/", ", and so on.

According to various embodiments of the present disclosure, script commands may be supported in the whitelist may include "ls", "tail", "cd", "pwd", "head", "cat", "ps", "free", "vmstat", "iostat", "uptime", "lsof", "ipcs", "mpstat", "grep", "wc", "uniq", "sort", "md5sum", and so on.

Although some symbols and script commands are exemplary enumerated above, one skilled in the art may realize that these symbols and script commands are enumerated for illustrative purposes only and are not intended to limit the protection scope of various embodiments of the present disclosure.

According to an embodiment of the present disclosure, the script command sending module 203 may establish an HTTP connection between the host port and the browser through the hypertext transfer protocol and receive the script command through the HTTP connection.

Figure 2C:
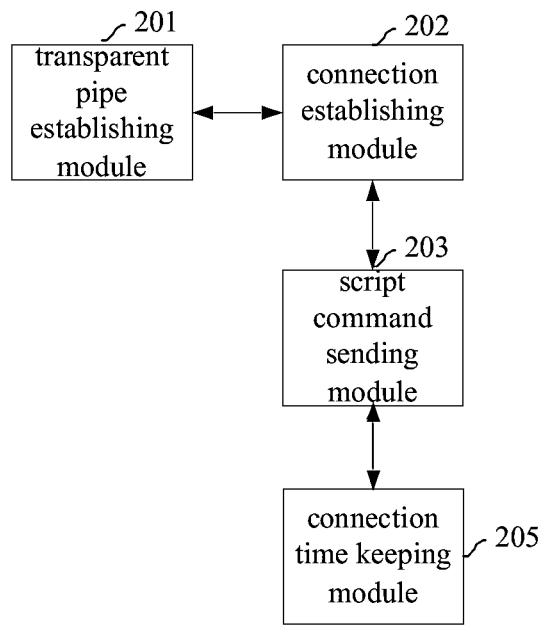
FIG. 2C is a diagram illustrating a structure of an apparatus for logging in a Unix-like virtual container, according to various embodiments of the present disclosure.

According to an embodiment of the present disclosure, the apparatus may further include a connection time keeping module 205 in which a connection time threshold is pre-configured, as shown in FIG. 2C.

The connection time keeping module 205 may determine whether the HTTP connection between the host port and the browser exceeds the connection time threshold. When the HTTP connection exceeds the connection time threshold, the connection time keeping module 205 may disconnect the HTTP connection. When the HTTP connection does not exceed the connection time threshold, the connection time keeping module 205 may keep the HTTP connection.

Figure 2D:
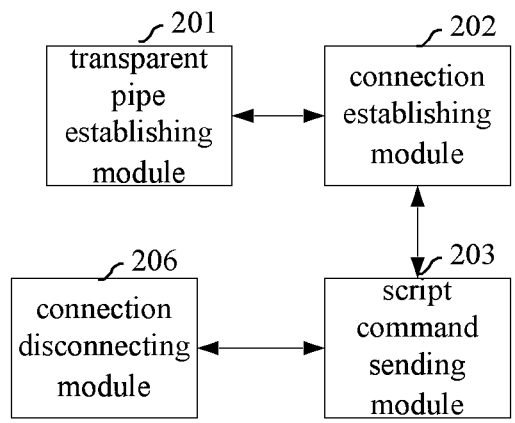
FIG. 2D is a diagram illustrating a structure of an apparatus for logging in a Unix-like virtual container, according to various embodiments of the present disclosure.

According to an embodiment of the present disclosure, the apparatus may further include a connection disconnecting module 206, as shown in FIG. 2D.

The connection disconnecting module 206 may receive an operation terminating script command through the host port, in which an ID of the first connection is carried in the operation terminating script command. The connection disconnecting module 206 may establish a second connection between the host port and the Unix-like virtual container through the transparent pipe and send the operation terminating script command to the Unix-like virtual container through the second connection, so that the Unix-like virtual container may extract the ID of the first connection from the operation terminating script command and terminate operations associated with the first connection.

According to an embodiment of the present disclosure, the script command sending module 203 may establish a first HTTP connection and a second HTTP connection between the browser and the host port through the hypertext transfer protocol. The connection disconnecting module 206 may receive, through the second HTTP connection, an operation terminating request sent from the browser, in which an ID of the first HTTP connection is carried in the request. After receiving the operation terminating request sent from the browser, the connection disconnecting module 206 may find the first HTTP connection according to the ID of the first HTTP connection carried in the request and send an operation terminating script command to the host port connecting the Unix-like virtual container, so that the host port sends the operation terminating script command to the Unix-like virtual container through the first connection between the Unix-like virtual container and the host port. The Unix-like virtual container executes the operation terminating script command and terminates operations associated with the first HTTP connection.

According to an embodiment of the present disclosure, the script command sending module 203 may establish an HTTP connection between the host port and the browser through the hypertext transfer protocol and receive the script command through the HTTP connection.

Figure 2E:
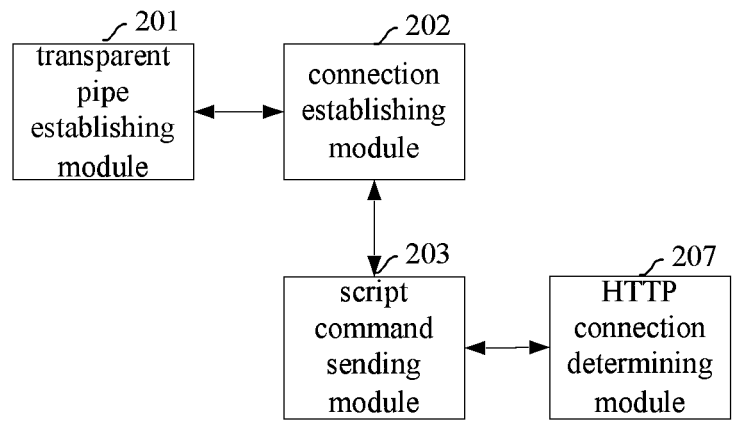
FIG. 2E is a diagram illustrating a structure of an apparatus for logging in a Unix-like virtual container, according to various embodiments of the present disclosure.

According to an embodiment of the present disclosure, the apparatus may further include an HTTP connection determining module 207, as shown in FIG. 2E.

The HTTP connection determining module 207 may determine whether the HTTP connection between the host port and the browser is disconnected. In response to determining that the HTTP connection between the host port and the browser is disconnected, the HTTP connection determining module 207 may send the operation terminating script command to the Unix-like virtual container based on the first connection between the Unix-like virtual container and the host port that is established based on the transparent pipe, so that the Unix-like virtual container executes the operation terminating script command and the operations associated with the HTTP connection are terminated.

Figure 2F:
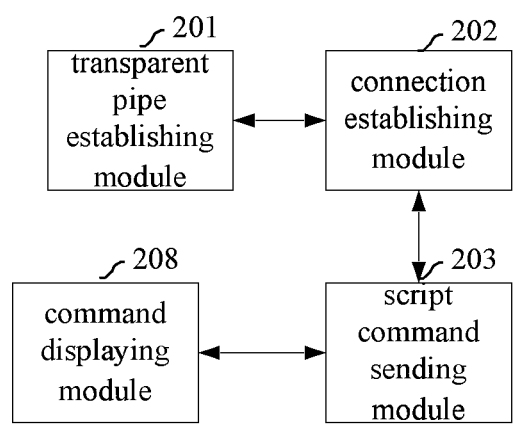
FIG. 2F is a diagram illustrating a structure of an apparatus for logging in a Unix-like virtual container, according to various embodiments of the present disclosure.

According to an embodiment of the present disclosure, the apparatus may further include a command displaying module 208, as shown in FIG. 2F.

The command displaying module 208 may generate a command display interface, capture a user keyboard operating character associated with the script command received by the host port, and display the user keyboard operating character on the command display interface.

The above-mentioned modules in the example embodiments of the present disclosure may be deployed either in a centralized or a distributed configuration; and may be either merged into a single module, or further split into a plurality of sub-modules.

Figure 2G:
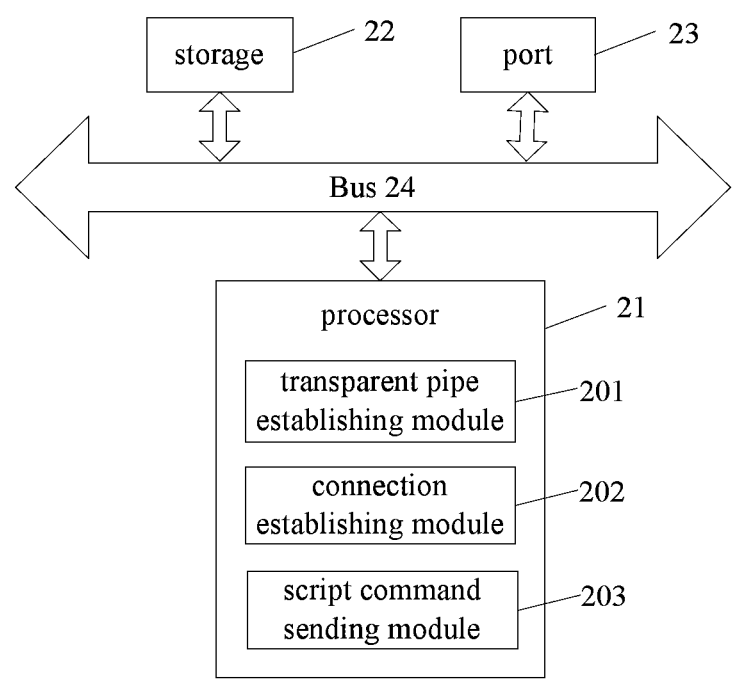
FIG. 2G is a diagram illustrating a hardware structure of an apparatus for logging in a Unix-like virtual container, according to various embodiments of the present disclosure.

The above-mentioned modules in the example embodiments of the present disclosure may be software (e.g., machine readable instructions stored in a non-transitory computer readable medium and executable by a processor), hardware (e.g., the processor of an Application Specific Integrated Circuit (ASIC)), or a combination thereof FIG. 2G is a diagram illustrating a hardware structure of the apparatus for logging in a Unix-like virtual container, according to various example embodiments of the present disclosure. As shown in FIG. 2G, the apparatus may include a processor 21, a storage 22, at least one port 23, and a bus 24. The processor 21 and the storage 22 are interconnected via the bus 24. The apparatus may receive and transmit data through the port 23.

According to various embodiments of the present disclosure, the storage 22 may store machine readable instructions. The processor 21 may execute the machine readable instructions to establish a corresponding relationship between a Unix-like virtual container and a port on a host running the Unix-like virtual container, establish a transparent pipe between the Unix-like virtual container and the host port based on the corresponding relationship, establish a first connection between the Unix-like virtual container and the host port based on the transparent pipe, receive a script command through the host port and send the script command to the Unix-like virtual container according to the first connection.

According to various embodiments of the present disclosure, the processor 21 may execute the machine readable instructions stored in the storage 22 to implement all or part of the procedures of the above method embodiments, which are not repeated herein.

Figure 2H:
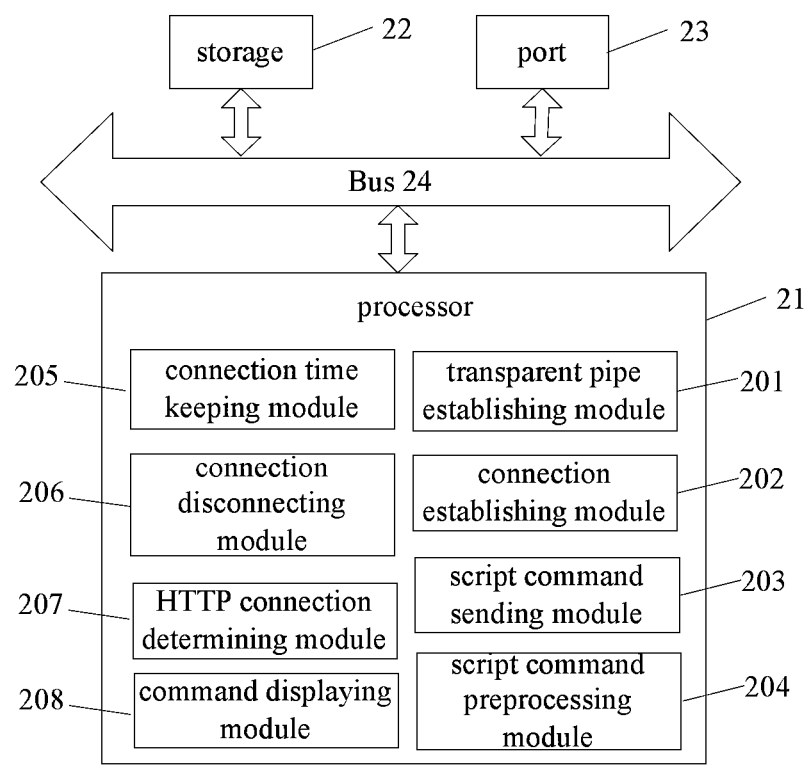
FIG. 2H is a diagram illustrating a hardware structure of an apparatus for logging in a Unix-like virtual container, according to various embodiments of the present disclosure.

As can be seen from the above description that, when the machine readable instructions stored in the storage 22 are executed by the processor 21, functions of the aforementioned transparent pipe establishing module 201, the connection establishing module 202, the script command sending module 203, the script command preprocessing module 204, the connection time keeping module 205, the connection disconnecting module 206, the HTTP connection determining module 207, and the command displaying module 208 are implemented. Therefore, an example of the hardware structure of the apparatus is shown in FIG. 2H.

Based on the above descriptions, various embodiments of the present disclosure further describe a system for logging in a Unix-like virtual container.

Figure 3:
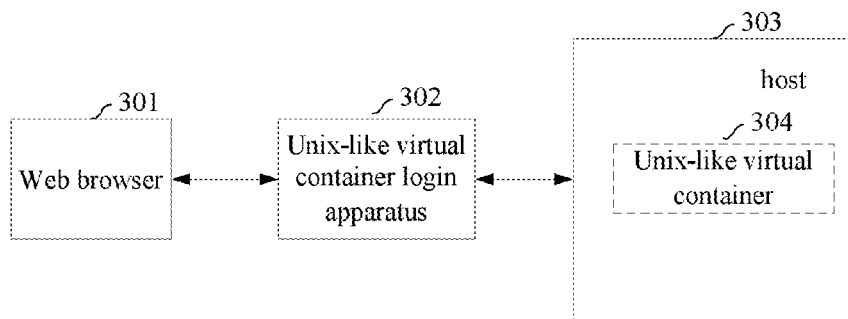
FIG. 3 is a diagram illustrating a structure of a system for logging in a Unix-like virtual container, according to various embodiments of the present disclosure.

FIG. 3 is a diagram illustrating a structure of the system for logging in a Unix-like virtual container, according to various embodiments of the present disclosure.

As shown in FIG. 3, the system may include a Web browser 301, a Unix-like virtual container login apparatus 302, and a host 303. The host 303 runs a Unix-like virtual container 304. There is an HTTP connection between the Web browser 301 and the Unix-like virtual container login apparatus 302.

The Web browser 301 may receive a script command and send the script command to the Unix-like virtual container login apparatus 302 through the HTTP connection.

The Unix-like virtual container login apparatus 302 may establish a corresponding relationship between the Unix-like virtual container 304 and a port on the host 303 and establish a transparent pipe between the Unix-like virtual container 304 and the host port based on the corresponding relationship. The Unix-like virtual container login apparatus 302 may establish a first connection between the Unix-like virtual container 304 and the host port based on the transparent pipe and send the script command received from the Web browser 301 to the Unix-like virtual container 304 according to the first connection.

In an embodiment of the present disclosure, the Unix-like virtual container login apparatus 302 may partition the script command according to a preset marker and perform symbol extension to the partitioned script command to obtain a symbol-extended script command. The Unix-like virtual container login apparatus 302 may determine whether the symbol-extended script command is included in a preset script command whitelist. In response to determining that the symbol-extended script command is included in the preset script command whitelist, the Unix-like virtual container login apparatus 302 may send the symbol-extended script command to the Unix-like virtual container 304 according to the first connection. Otherwise, the Unix-like virtual container login apparatus 302 may prompt that the command is illegal.

In an embodiment of the present disclosure, the Unix-like virtual container login apparatus 302 may generate a command display interface, capture a user keyboard operating character associated with the script command received by the host port, and display the user keyboard operating character on the command display interface.

In practice, the method and apparatus for logging in a Unix-like virtual container described in embodiments of the present disclosure may be implemented in various forms. For example, the apparatus for logging in a Unix-like virtual container may be developed, following a standardized application programming interface, as a plug-in that may be installed in a browser. Alternatively, the apparatus for logging in a Unix-like virtual container may be encapsulated as an application for downloading and using by the user.

The method and apparatus for logging in a Unix-like virtual container described in embodiments of the present disclosure may be applied to various browsers, such as IE, chrome, safari, firefox, and so on. Moreover, the method for logging in a Unix-like virtual container described in embodiments of the present disclosure may be applied to various hardware entities like a personal computer (PC), a tablet computer (PAD), a smart phone, and so on.

Figure 4:
FIG. 4 is a diagram illustrating an interface for logging in a Unix-like virtual container through a tablet computer, according to various embodiments of the present disclosure.
Figure 5:
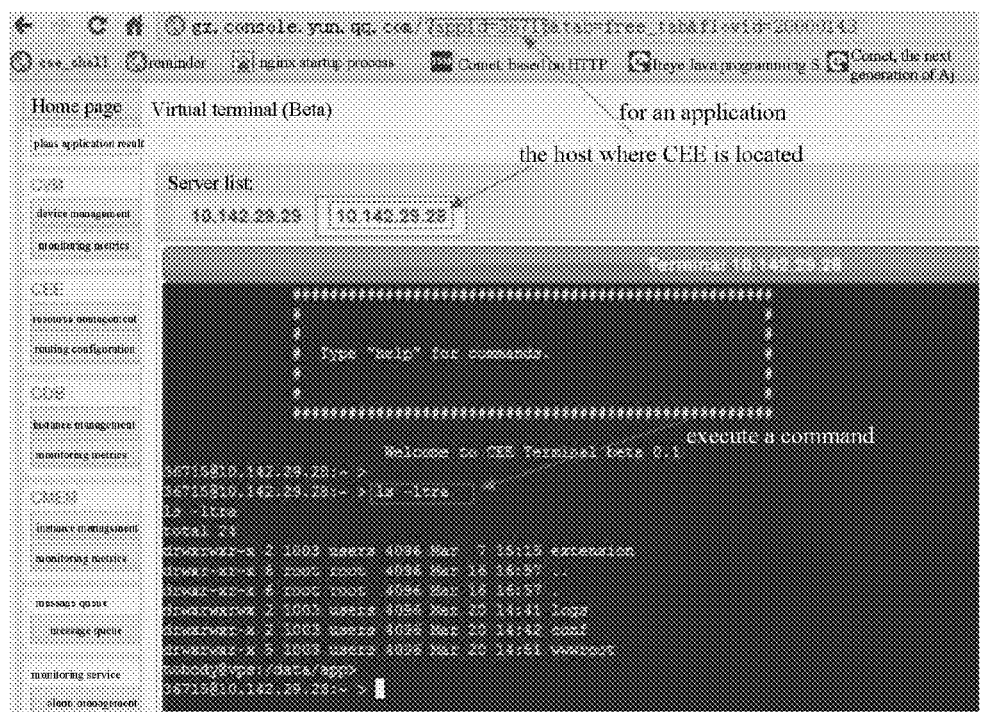
FIG. 5 is a diagram illustrating an interface for logging in a Unix-like virtual container through a personal computer, according to various embodiments of the present disclosure.

For example, FIG. 4 is a diagram illustrating an interface for logging in a Unix-like virtual container through a tablet computer, according to various embodiments of the present disclosure. FIG. 5 is a diagram illustrating an interface for logging in a Unix-like virtual container through a personal computer, according to various embodiments of the present disclosure.

When the method and apparatus for logging in a Unix-like virtual container described in embodiments of the present disclosure are developed as a plug-in, the method and apparatus may be implemented as various types of the plug-in such as ocx, dll, cab, and so on. In addition, the method and apparatus for logging in a Unix-like virtual container described in embodiments of the present disclosure may be implemented through technologies like a Flash plug-in, a RealPlayer plug-in, an MMS plug-in, an MIDI stave plug-in, an ActiveX plug-in, and so on.

The method and apparatus for logging in a Unix-like virtual container described in embodiments of the present disclosure may be stored in a variety of storage media in the form of instructions or an instruction set. The storage media may include but not be limited to floppy disk, CD, DVD, hard disk, flash memory, U disk, CF card, SD card, MMC card, SM card, memory stick, xD card, and so on.

In addition, the method and apparatus for logging in a Unix-like virtual container described in embodiments of the present disclosure may be applied to a storage medium based on Nand flash, such as U disk, CF card, SD card, SDHC card, MMC card, SM card, memory stick, xD card, and so on.

As described above, according to various embodiments of the present disclosure, a corresponding relationship between a Unix-like virtual container and a port on a host running the Unix-like virtual container is established. A transparent pipe between the Unix-like virtual container and the host port is established based on the corresponding relationship between the Unix-like virtual container and the host port. A first connection between the Unix-like virtual container and the host port is established based on the transparent pipe. A script command is received through the host port and the script command is sent to the Unix-like virtual container according to the first connection. When various embodiments of the present disclosure are employed, the Unix-like virtual container can be logged in through the connection between the host port and the Unix-like virtual container and the script command can be sent to the Unix-like virtual container from the outside of the host. Therefore, information within the Unix-like virtual container such as files, CPU information, disk I/O, network I/O, and so forth, can be easily viewed according to the script command, which is important for various operations like online debugging, log viewing, real-time control of device resources, and so on.

Moreover, the login of the Unix-like virtual container through the host port can ensure the information security of the Unix-like virtual container. Further, the access efficiency can be improved through asynchronous access.

The hardware modules or units in various embodiments of the present disclosure can be implemented mechanically or electronically. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

According to the description of the above examples, it can be clearly understood by those skilled in the art that the embodiments of the present disclosure can be implemented by software accompanying with necessary general hardware platforms, or by hardware. Based on this, the essential parts of the technical solution mentioned above or the part contributed to the prior art can be presented in the form of a software product. The software product may be stored in a storage medium, and includes a plurality of instructions for making a terminal device (which can be a mobile phone, a personal computer, a server or a network device) implement methods recited in the embodiments of the present disclosure.

Those skilled in the art may understand that all or part of the procedures of the methods of the above embodiments may be implemented by hardware modules following machine readable instructions. The machine readable instructions may be stored in a computer-readable storage medium. When the machine readable instructions are executed, the procedures of the method embodiments may be implemented. The storage medium may be diskette, CD, ROM (Read-Only Memory) or RAM (Random Access Memory), and etc.

The figures are only illustrations of examples, wherein the modules or procedures shown in the figures are not necessarily essential for implementing the present disclosure. The modules in the aforesaid examples can be combined into one module or further divided into a plurality of sub-modules.

The above are several embodiments of the present disclosure, and are not used for limiting the protection scope of the present disclosure. Any modifications, equivalents, improvements, etc., made under the principle of the present disclosure should be included in the protection scope of the present disclosure.

The invention claimed is:

1. A method for logging in a Unix-type virtual container, comprising:
    establishing a corresponding relationship between a Unix-type virtual container and a port on a host running the Unix-type virtual container;
    establishing a pipe between the Unix-type virtual container and the host port based on the corresponding relationship, and establishing a first connection between the Unix-type virtual container and the host port based on the pipe; and
    receiving a script command through the host port, and sending the script command to the Unix-type virtual container according to the first connection;
    wherein after receiving the script command through the host port and before sending the script command to the Unix-type virtual container, the method further comprises:
    partitioning the script command according to a preset marker and performing symbol extension to the partitioned script command to obtain a symbol-extended script command;
    determining whether the symbol-extended script command is included in a preset script command whitelist; and
    in response to determining that the symbol-extended script command is included in the preset script command whitelist, sending the symbol-extended script command to the Unix-type virtual container according to the first connection.

2. The method of claim 1, wherein the operation of receiving the script command through the host port comprises:
    establishing a hypertext transfer protocol (HTTP) connection between the host port and a browser through a hypertext transfer protocol and receiving the script command through the HTTP connection;
    the method further comprising:
    preconfiguring a connection time threshold;
    determining whether the HTTP connection between the host port and the browser exceeds the connection time threshold;
    in response to determining that the HTTP connection between the host port and the browser exceeds the connection time threshold, disconnecting the HTTP connection; and
    in response to determining that the HTTP connection between the host port and the browser does not exceed the connection time threshold, keeping the HTTP connection.

3. The method of claim 1, further comprising:
    establishing a first HTTP connection and a second HTTP connection between the host port and a browser through a hypertext transfer protocol;
    receiving, through the second HTTP connection, an operation terminating request sent from the browser, wherein an identifier (ID) of the first HTTP connection is carried in the request; and
    upon receiving the operation terminating request sent from the browser, finding the first HTTP connection according to the ID of the first HTTP connection carried in the request and sending an operation terminating script command to the Unix-type virtual container through the first connection between the Unix-type virtual container and the host port, so that the Unix-type virtual container executes the operation terminating script command and terminates operations associated with the first HTTP connection.

4. The method of claim 1, wherein the operation of receiving the script command through the host port comprises:

establishing an HTTP connection between the host port and a browser through a hypertext transfer protocol and receiving the script command through the HTTP connection;

the method further comprising:

determining whether the HTTP connection between the host port and the browser is disconnected; and in response to determining that the HTTP connection between the host port and the browser is disconnected, sending an operation terminating script command to the Unix-type virtual container through the first connection, so that the Unix-type virtual container executes the operation terminating script command and terminates operations associated with the HTTP connection.

5. The method of claim 1, further comprising:

generating a command display interface;

capturing a user keyboard operating character associated with the script command received by the host port; and displaying the user keyboard operating character on the command display interface.

6. The method of claim 1, further comprising:

the Unix-type virtual container responding to the script command and returning a script command response to the host port in a manner of data chunking; and sending, by the host port, chunked data to an interface of a browser for synchronized displaying.

7. An apparatus for logging in a Unix-type virtual container, comprising:

at least one hardware processor and at least one memory, the at least one memory storing a plurality of modules comprising:

a pipe establishing module, configured to establish a corresponding relationship between a Unix-type virtual container and a port on a host running the Unix-type virtual container, and establish a pipe between the Unix-type virtual container and the host port based on the corresponding relationship;

a connection establishing module, configured to establish a first connection between the Unix-type virtual container and the host port based on the pipe; and a script command sending module, configured to receive a script command through the host port and send the script command to the Unix-type virtual container according to the first connection;

a script command preprocessing module, configured to partition the script command according to a preset marker, perform symbol extension to the partitioned script command to obtain a symbol-extended script command, determine whether the symbol-extended script command is included in a preset script command whitelist, and in response to determining that the symbol-extended script command is included in the preset script command whitelist, enable the script command sending module to send the symbol-extended script command to the Unix-type virtual container according to the first connection.

8. The apparatus of claim 7, wherein the script command sending module is configured to establish a hypertext transfer protocol (HTTP) connection between the host port and a browser through a hypertext transfer protocol and receive the script command through the HTTP connection;

wherein the plurality of modules stored in the at least one memory further comprise:

a connection time keeping module, configured to preconfigure a connection time threshold, determine whether the HTTP connection between the host port and the browser exceeds the connection time threshold, in response to determining that the HTTP connection exceeds the connection time threshold, disconnect the HTTP connection, and in response to determining that the HTTP connection does not exceed the connection time threshold, keep the HTTP connection.

9. The apparatus of claim 7, wherein the script command sending module is configured to establish a first HTTP connection and a second HTTP connection between a browser and the host port through a hypertext transfer protocol;

wherein the plurality of modules stored in the at least one memory further comprise:

a connection disconnecting module, configured to receive, through the second HTTP connection, an operation terminating request sent from the browser, wherein an identifier (ID) of the first HTTP connection is carried in the request, and upon receiving the operation terminating request sent from the browser, find the first HTTP connection according to the ID of the first HTTP connection carried in the request and send an operation terminating script command to the Unix-type virtual container through the first connection between the Unix-type virtual container and the host port, so that the Unix-type virtual container executes the operation terminating script command and terminates operations associated with the first HTTP connection.

10. The apparatus of claim 7, wherein the script command sending module is configured to establish an HTTP connection between a browser and the host port through a hypertext transfer protocol and receive the script command through the HTTP connection;

wherein the plurality of modules stored in the at least one memory further comprise:

an HTTP connection determining module, configured to determine whether the HTTP connection between the host port and the browser is disconnected, and in response to determining that the HTTP connection between the host port and the browser is disconnected, send an operation terminating script command to the Unix-type virtual container through the first connection, so that the Unix-type virtual container executes the operation terminating script command and terminates operations associated with the HTTP connection.

11. A system for logging in a Unix-type virtual container, comprising a Web browser, a Unix-type virtual container login apparatus, and a host; wherein the host runs a Unix-type virtual container and there is a hypertext transfer protocol (HTTP) connection between the Web browser and the Unix-type virtual container login apparatus;

wherein the Web browser is configured to receive a script command and send the script command to the Unix-type virtual container login apparatus through the HTTP connection; and the Unix-type virtual container login apparatus is configured to establish a corresponding relationship between the Unix-type virtual container and a port on the host, and establish a pipe between the Unix-type virtual container and the host port based on the corresponding relationship,
establish a first connection between the Unix-type virtual container and the host port based on the pipe,
receive the script command sent from the Web browser through the host port, and
send the script command to the Unix-type virtual container according to the first connection;
wherein the Unix-type virtual container login apparatus is further configured to
partition the script command according to a preset marker,
perform symbol extension to the partitioned script command to obtain a symbol-extended script command,
determine whether the symbol-extended script command is included in a preset script command whitelist, and
in response to determining that the symbol-extended script command is included in the preset script command whitelist, send the symbol-extended script command to the Unix-type virtual container according to the first connection.

12. The system of claim 11, wherein the Unix-type virtual container login apparatus is further configured to
generate a command display interface,
capture a user keyboard operating character associated with the script command received by the host port, and
display the user keyboard operating character on the command display interface.

13. The system of claim 11, wherein the Unix-type virtual container login apparatus is further configured to establish the first connection between the Unix-type virtual container and the host port through the pipe and based on a Secure Shell protocol (SSH) or a Secure Shell protocol 2 (SSH2).

* * * * *